Feb. 22, 1938.   H. HALPERIN   2,108,889
DUCT SPLICE FOR HIGH VOLTAGE CABLES
Filed Oct. 21, 1935
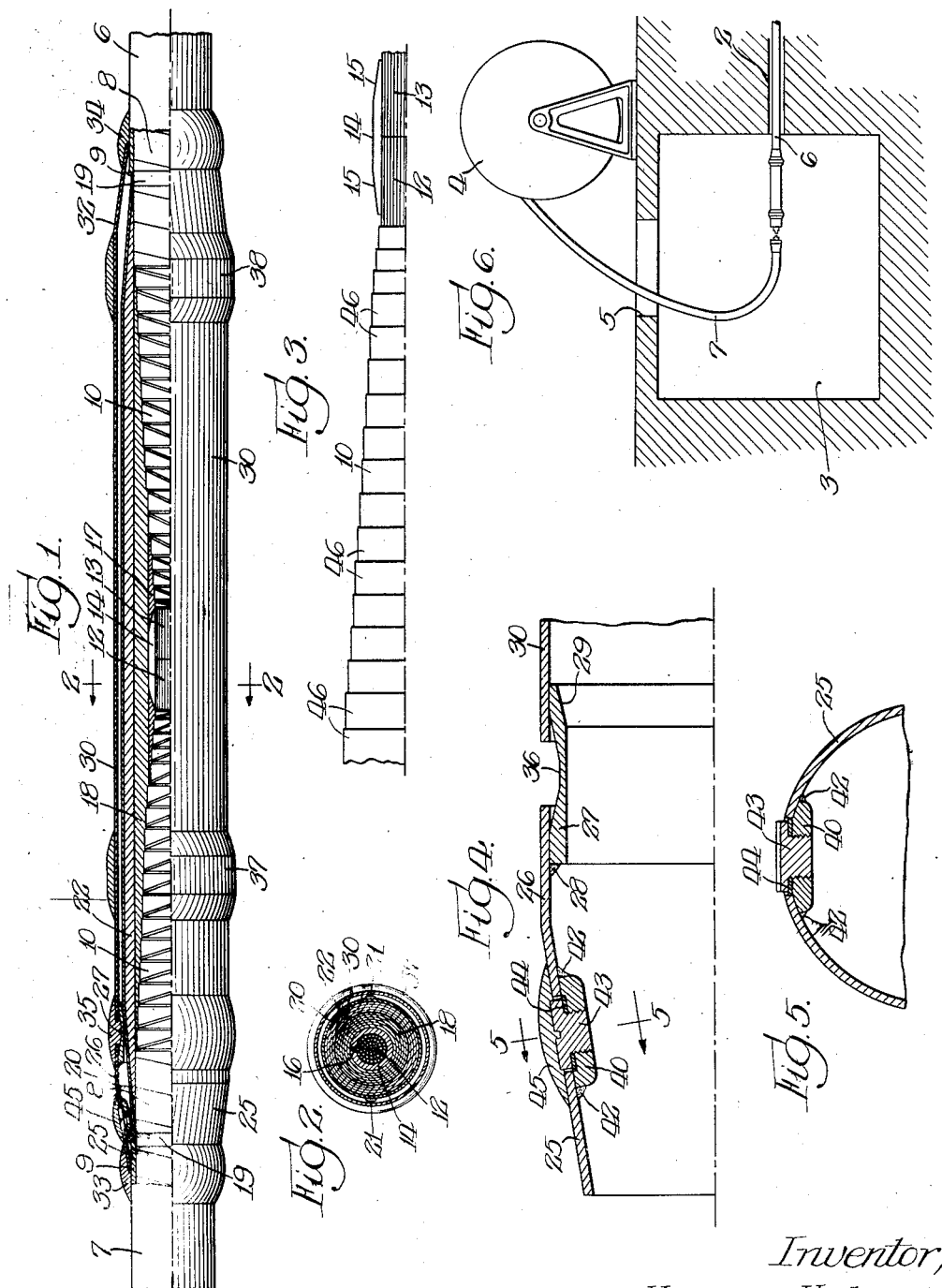
Inventor;-
Herman Halperin,
By ... Attys.

UNITED STATES PATENT OFFICE 2,108,889

DUCT SPLICE FOR HIGH VOLTAGE CABLES

Herman Halperin, Chicago, Ill.

Application October 21, 1935, Serial No. 45,910

7 Claims. (Cl. 173—268)

The present invention relates to duct splices, and more particularly is directed to such splices for joining together lengths of high voltage cable and the like which must be pulled through ducts or conduits.

While duct splices have heretofore been made for cables under a voltage rating of 33 kv., it would be impractical to employ such type of splices in cables having a higher voltage rating, first, because of the undesirable electrical characteristics which such splices would possess if applied to high voltage cable, and second, the mechanical limitations of duct and splice assembly would prevent use of such splices. The principles involved in the construction of previous splices, if applied to high voltage cable, would result in dimensions too large for installation in the usual conduits, and the electrical properties would be unsatisfactory because of the possibility of excessive temperatures occurring incidental to the high voltage cable when installed in ducts which have higher temperatures than do manholes.

Cable joints have also been devised for joining adjacent lengths of cable in a manhole, but the solution of that problem is not applicable to the development of duct splices, since the operating conditions, spacial limitations and mechanical requirements are entirely different.

Duct splices of the prior types have had outer casings consisting of lead sleeving. In order to withstand the mechanical stresses incidental to the internal pressures caused by heating during heavy loads on the line, the use of lead sleeving on high voltage cable splices would require a thickness several times the thickness allowable for use in conduits or ducts.

It is a primary object of the present invention to provide a duct splice having the desired electrical and mechanical characteristics for a splice employed in joining high voltage cable lengths together in such manner that they may be pulled through ducts and the like, particularly for cable rated at about 33 kv. and higher voltages.

Another object of the present invention is to provide for splicing two adjacent lengths of cable together by first pulling one length into the duct, constructing the splice in the manhole for connecting the end of this length with the adjacent end of the other length to be joined thereto, and then pulling the completed spliced length through the duct into final position. To complete the installation, the ends of the spliced lengths would then be connected by regular joints to adjacent lengths in the line, to become a portion of a service or supply line.

Another feature of the present invention is to provide a casing or external sleeve comprising a rather long cylindrical thin metallic sleeve carried on the cable length in the duct, and a shorter sleeve slipped over the adjacent end of the cable in the manhole, the two sleeves being rigidly connected and sealed together when the splice is completed.

The primary result obtained by the use of the present type of duct splice herein disclosed is to produce a splice that more nearly approximates a cable in construction and operation than has been possible in previous types of splices with which I am familiar.

A still further feature of the present invention is the provision of a duct splice in which the splice acts as part of the cable, the insulation expanding and creating pressures under heavy loads on the lines and contracting when light loads are being carried. With the present duct splice, I preferably employ a filling compound similar to the usual cable impregnating compound, instead of being much heavier, as is usually the case. This results in free interchange of compound between the inside of the duct splice and the cable insulation adjacent the splice. The duct splice operates without maintenance or oil feed from a reservoir, thereby clearly distinguishing from an ordinary high voltage cable joint. The cable compound can also flow through the splice from one conductor to the other in the present construction, thereby simulating closely the flow of such compound in the cable itself.

Another essential feature of the present invention is the provision of a longer leakage path than would ordinarily be employed in high voltage cable joints in a manhole. This is necessary due to the absence of thin oil which serves to improve the impregnation of the usual joints in manholes on similar cables, and because of the slight separation that appears to occur between the applied insulation and the stepped factory insulation during the installation of lengths containing the duct splices. This separation is apparently due to the "skinning back" effect produced by the longitudinal tension placed on the cable when it is pulled through a duct or conduit. I have found that a certain critical relation exists between the tapered surface of the stepped down insulation and the cohesion of the applied insulation under this tension, and that the angle of taper or stepping down must be directly proportional not only to the electrical leakage path required, as in the case of oil-filled cable joints in manholes, but also to the external diameter of the cable and the mechanical cohesion required to compensate for the tension stresses incident to pulling of the spliced cable through the ducts. It is necessary, therefore, to provide a predetermined stepping down of the factory insulation as a function of both of these factors.

Another object of my present invention is to effect a reduction in the overall splice diameter of the joint, as compared to the diameter of insulation used in manhole joints, by the special construction shown.

The present invention also possesses a distinct advantage over previous duct splices in the use of an internally tinned rigid copper sleeve in place of the usual lead sleeve. This provides for withstanding the relatively high internal pressures caused by heavy loads through the splice with a minimum thickness of metal, and also produces the rigidity desired for drawing spliced cable through ducts or the like. Special preformed riding wipes prevent abrasion of the casing as it is drawn through the ducts.

The present type of duct splice also departs from the prior types of such splices in providing for complete evacuation of the splice and subsequent filling of the casing with degasified and moisture free insulating compound comparable to the usual cable impregnating compound in viscosity, electrical properties, and thermal properties.

Other objects and advantages of the present invention will appear more fully from the following detailed description, which, taken in conjunction with the accompanying drawing, will disclose to those skilled in the art, the particular construction and operation of a preferred form of the present invention.

In the drawing:

Figure 1 is an elevational view of a cable splice, partly in section, showing one manner in which the present duct splice may be formed;

Figure 2 is a vertical sectional view through the spliced joint, taken substantially on line 2—2 of Figure 1;

Figure 3 is a partial diagrammatic view, showing the manner of stepping down the factory installation to produce the present cable joint;

Figure 4 is a detail sectional view of the manner in which the two copper sleeves of the spliced casing are put together;

Figure 5 is a sectional view taken substantially on line 5—5 of Figure 4; and

Figure 6 is a diagrammatic view of the manner in which the duct splice is formed in a manhole or the like.

Referring now in detail to the drawing, I have disclosed in Figure 1 a pair of lead sheathed insulated cables 6 and 7, which cables are provided with wrapped insulation 8 beneath the lead sheaths 9 thereof, which insulation is tapered, as indicated at 10, toward the ends of the cables to provide short lengths of bare conductors, as indicated at 12 and 13, respectively, the conductors 12 and 13 being brought into substantial abutting engagement as shown.

In forming a duct splice according to the teachings of the present invention, the cable 6 is first pulled through the duct 2 of Figure 6 until the end portion thereof which is to be spliced is left projecting from the duct into the manhole 3 far enough to accommodate the longer of the casing sleeves adjacent the splice during formation of the spliced joint, as shown in Figure 6. The cable 7 which is to be spliced thereto is then led into the manhole from the reel 4 through the opening 5, and brought into a position with its end adjacent the extending end of the cable 6. The end of the cable 6 is then stripped down immediately adjacent its end, and the copper sleeve 14, which is tapered at its extending ends as indicated at 15, is slipped over the bared conductor 13 to a point substantially adjacent the innermost end of the stepped insulation 10.

The adjacent bared conductor 12 of the cable 7 is then passed into the opposite end of the sleeve 14 and brought into substantial abutting engagement with the conductor 13. The sleeve 14 is preferably a split sleeve, that is, a sleeve having a longitudinal slot 16 extending the full length thereof. The slot is provided for the purpose of pouring solder or the like into the interior of the sleeve 14 after the conductors 12 and 13 have been assembled therein, whereby the solder flows over the conductors to effect a mechanical and electrical connection between the conductors 12 and 13 and the sleeve 14. This secures the two conductor ends rigidly together within the connector. This connection between the two conductors can also be accomplished by interlacing the strands in a manner well known in the art and covering the interlaced strands with a very thin copper sheet to obtain a smooth surface. Such a connection obviously would be used only if a reduction in diameter of this connection is essential.

After the sleeve 14 has been placed in position and soldered, the next operation comprises stripping off the lead sheath and stepping down the insulation. This insulation is preferably stepped down by tearing the paper tapes against piano wire or the like in predetermined lengths to provide longitudinally extending steps of desired length and having a definite relative ratio of decreasing diameters giving a leakage path substantially greater than would normally be employed. This is to compensate for mechanical displacement of insulation that occurs due to the tension on the cable in drawing the splice through a duct. Taping compound is then applied over each of the steps, and preimpregnated cotton yarn is wrapped adjacent the connector ends around the bared conductors, and a turn or so of the yarn is wrapped adjacent to each insulation step. The stepped down insulation is then flushed with heated insulating oil and taping compound is applied thereto.

A wrapping of varnished cambric tape, impregnated paper tape, or any other desired or suitable high voltage tape, is then applied thereover, as indicated at 17 in Figure 1, extending from the sleeve 14 oppositely over the tapered ends 15 thereof and onto two or three of the adjacent steps of the factory insulation 10 of the cable 7. This tape is applied by wrapping half-lapped layers of preferably narrow tape to the surface of the connector, and the insulation is then continued with butt-lapped layers of tape indicated at 18, extending substantially to the outer diameter of the cable insulation. Taping compound is applied over each layer, and the entire joint is flushed with insulating oil heated to approximately 115° C. at intervals as the tape 18 is applied. After the flushing of the insulation with this oil, taping compound is applied to the entire splice.

After the insulation 18 has all been applied, copper bands indicated at 19 are inserted about the cable insulation 8, and, with the ends butted, are soldered to the cable sheaths 9 in three places equally spaced around the cable.

A metal braid strip, preferably although not necessarily of copper, indicated at 20, is then placed in position, and the end thereof is soldered to the band 19 and the sheath 9. The outer layer of cable insulation 8 is then removed and the splice is flushed with insulating oil heated to 115° C. Insulating tape 22, similar to tape 18, is then applied over the tape 18 and over cable insulation 8 to a point about one-quarter of an inch from the end of the sheath 9, being taped with butt-lapped layers of perhaps one inch tape to a diameter slightly in excess of the diameter of the cables 6 and 7. Over each layer of tape 22 I preferably apply taping compound. Then braid 20 is soldered to the sheath and to the shielding band 19. The braid 20 is finally wrapped about the tape 22, preferably in half-lapped wrappings over the tapered portions of the insulation 22 at the opposite ends thereof, and in one-third lapped wrappings over the straight cylindrical portion of the tape 22, and then soldered to the opposite band 19 and sheath. The trailing ends of the braid are trimmed and soldered, and longitudinal strips of solder are applied lengthwise over the braid in two places 21 equally spaced about the circumference of the tape to hold the braid in position. The splice is then flushed with insulating oil heated to 115° C.

After the braid has been applied, the next step in the formation of the splice is to apply the casing thereover. Over the sheath of cable 7 there is supported the cold rolled annealed copper tubing 25 which is preferably internally tinned. If a smaller diameter cable is used, spacing means, such as bands or the like, may be inserted between the ends of the casing and the sheaths of the cable. This tubing is substantially frusto-conical in shape, and at its larger end is provided with a cylindrically flanged portion 26 adapted to have telescopic engagement with a connector member 27 which is brazed thereto as indicated at 28. The opposite end of the connector 27 is provided with an outwardly flared inner surface 29 conforming substantially to the sloped surface of the insulation 22, and is adapted to extend into the copper sleeve 30, which sleeve is preferably tinned, the sleeve 30 being slipped over the end of the collar 27 and enclosing the spliced connection between the conductors 6 and 7. The opposite end of the sleeve 30 is tapered, as shown at 32, the metal in the sleeve being preferably annealed at each end, whereby it may be readily spun into proper shape. The extending end of the sleeve 30 is secured to the sheath of the cable 6, suitable lead wipes 33 and 34 being applied over the sheath and the corresponding portions of the casing members 25 and 32.

In order to seal the connection between the end 26 of the casing 25 and form a rigid joint between the connector 27 and the sleeve 30, I preferably provide the soldered wipe 35 extending into a slightly grooved and undercut portion 36 of the sleeve 27, and having sealing engagement with the ends of the casings 25 and 30.

Suitable riding wipes 37 and 38 are preferably preformed on the external surface of the sleeve 30 to take care of abrasion and rubbing when the splice is pulled through a duct, thereby protecting the copper sleeve against abrasion or wear. Of course, such wipes may be formed in the field, if necessary, at the time of making the splice. These wipes are flatted in a lathe or the like to provide the proper minimum diameter uniformly about the casing.

In order to provide for evacuation of the duct joint and to fill the same with compound, I provide filler means comprising the inner closure member 40 which is brazed as indicated at 42 to the internal surface of the tapered portion of the casing 25, and which is provided with a threaded opening receiving the closure plug 43. The member 40 is preferably provided with a recessed portion adapted to receive an uncompressed closure gasket 44 which is compressed into sealing engagement by means of the threading of the plug 43 into the threaded opening of the member 40. By tinning of the entire inner surface of sleeve 25, the brazes are made oil tight and leak proof.

It will be noted that the plug opening is placed at one end of the tapered portion of the external rigid sheathing, where no aggravated mechanical stresses will be placed on the plug or its soldered seal during installation. In the completion of the formation of the particular splice disclosed, I first flush the splice with insulating oil heated to 115° C. before the sleeves are assembled in position. After the rigid sleeves have been assembled into position and soldered at their telescoping joints and to the sheaths, the entire casing is evacuated by applying a vacuum pump or the like to the plug opening in the member 40. This evacuation continues for about fifteen minutes, with tests being made periodically in order to remove all entrapped air and gases from the splice.

The interior of the splice is then back-filled with degasified cable impregnating compound heated to approximately 105° C., which compound fills all the interstices of the splice and completely fills the enclosed portion within the casings 25 and 30. A pressure of 25 pounds per square inch is imposed on the interior of the casing for approximately five minutes, and leakage tests are made at all of the joints in order to insure that the splice is sealed properly. After the pressure tests have been made, the compound supply is maintained connected to the interior of the splice for a considerable period of time, for example, one-half hour, while the compound itself is cooling within the splice, in order to take care of any contraction of the compound within the splice due to this cooling. The supply connection is then removed, the plug 43 is threaded into the opening in the member 40 and a suitable solder seal 45 is formed over the top of the plug 43 in order to seal this opening against possible leakage. The splice has then been completed.

It will be noted that with the construction shown, I provide an unusual type of casing for duct splices, inasmuch as the outer casing is rigid as compared with ordinary lead sleeving, and consists only of two cylindrical copper tubes. The two lengths of sleeve forming the casing are so related that the splice is capable of relatively easy formation in a manhole or the like. Also, the casing is well protected against conditions which may be met with in such types of installation, in that the casing members are heavily tinned for corrosion resistance, and the riding wipes of solder protect the casing from abrasion while being pulled into the duct.

In service, the duct splice of the present invention acts as a part of the cable, the insulation expanding and creating pressures of from 20 to 100 pounds per square inch when the line carries heavy loads. The insulation contracts and perhaps even vacua conditions exist when very light loads are being carried. With this type of duct splice where the filling compound is similar to cable impregnating compound, instead of being much heavier, there is free interchange of compound between the inside of the duct splice and the cable installation adjacent to the splice.

From an examination of Figure 3, which shows a plurality of steps 46 producing a substantially tapered installation extending down to the bare conductors 12, it would appear that a longer leakage passage has been provided than would ordinarily be thought necessary. However, this predetermined stepped formation is essential because of the absence of thin oil and because of the slight separation that apparently occurs between the applied insulation and the stepped factory insulation during the installation of lengths containing the duct splices and drawing the same through the ducts.

The proportions of the stepped taper on each cable length are a function of both the electrical leakage path required for splices in cables carrying the high voltage to which high tension cables are subjected, and also a function of the mechanical stresses imposed on the insulation by reason of the tension produced thereon when the cable is drawn through a duct. This mechanical tension, which is applied to the outer sheath of the cable during the drawing operation, has a tendency to "skin back" the insulation, and a much longer path is required in order to produce the proper binding between the applied insulation and the stepped factory insulation, and in order to maintain a suitable length of leakage path, since some separation may occur between the stepped insulation and the applied insulation. For this reason, the amount of decrease of diameter of each step and the number of steps required bears a direct relation to the mechanical tension which must be applied to the cable and the electrical leakage path that must be supplied, and consequently must be predetermined before the splice is formed.

The degasified oil which is introduced into the splice after the evacuation thereof is similar to cable compound in viscosity and electrical properties, and is substantially free of gas and moisture.

I have found that the stepping taper must be increased at least 12% to give proper electrical and mechanical strength due to the tension produced on such a splice in installation.

I am aware that the present invention is susceptible to changes and modifications of certain details of construction without departing from the underlying principles thereof, and I therefore do not intend to be limited to the exact structure shown and described, except as defined by the scope and spirit of the appended claims.

I claim:

1. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, and a rigid sleeve enclosing said insulating means and sealed at its ends to said lead sheathing of said cables and formed of a metal having a substantially higher unit tensile strength than that of the lead sheathing to withstand the stresses incident to pulling the spliced cables through the duct without substantially disturbing the insulating qualities of said insulating means enclosed thereby.

2. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, a rigid sleeve enclosing said insulating means and sealed at its ends to said lead sheathing of said cables and formed of a metal having a substantially higher unit tensile strength than that of the lead sheathing to withstand the stresses incident to pulling the spliced cables through the duct without substantially disturbing the insulating qualities of said insulating means enclosed thereby, and riding wipes in spaced apart relation on said sleeve and extending radially therefrom beyond any parts thereof.

3. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, and a rigid sleeve enclosing said insulating means and sealed at its ends to said lead sheathing of said cables and formed of copper to withstand the stresses incident to pulling the spliced cables through the duct without substantially disturbing the insulating qualities of said insulating means enclosed thereby.

4. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, a rigid sleeve enclosing said insulating means and sealed at its ends to said lead sheathing of said cables and formed of tinned copper to withstand the stresses incident to pulling the spliced cables through the duct without substantially disturbing the insulating qualities of said insulating means enclosed thereby, and a riding wipe at each end of said sleeve extending radially therefrom beyond any parts of the same to prevent abrasion of said tinned copper sleeve on being drawn into the duct.

5. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, a rigid sleeve enclosing said insulating means and sealed at its ends to said lead sheathing of said cables and formed of a metal having a substantially higher unit tensile strength than that of the lead sheathing to withstand the stresses incident to pulling the spliced cables through the duct without substantially disturbing the insulating qualities of said insulating means enclosed thereby, the diameter of said sleeve being slightly greater than that of said sheaths and the end portions thereof being tapered to the diameter of said sheaths, and filler means in one of said tapered end portions providing for evacuation and subsequent filling of the splice with cable compound.

6. A cable duct splice joining two adjacent lengths of lead sheathed electricity conducting cables adapted to be pulled into a cable duct having a diameter slightly in excess of that of the sheaths comprising, in combination, connector means joining the adjacent ends of the conductors in said cables, insulating means surrounding said connector means, a rigid sleeve enclosing said insulating means and sealed at its ends to said lead sheathing of said cables and formed of a metal having a substantially higher unit tensile strength than that of the lead sheathing to withstand the stresses incident to pulling the spliced cables through the duct without substantially disturbing the insulating qualities of said insulating means enclosed thereby, the diameter of said sleeve being slightly greater than that of said sheaths and the end portions thereof being tapered to the diameter of said sheaths, filler means in one of said tapered end portions providing for evacuation and subsequent filling of the splice with cable compound, and a riding wipe at each end of said sleeve and extending radially therefrom beyond any parts of the same and of said filler.

7. A cable duct splice joining two adjacent lengths of lead sheathed electricity conducting cables adapted to be pulled into a cable duct having a diameter slightly in excess of that of the sheaths comprising in combination, connector means joining the adjacent ends of the conductors in said cables, insulating means surrounding said connector means, a rigid sleeve enclosing said insulating means and sealed at its ends to said lead sheathing of said cables and formed of tinned copper to withstand the stresses incident to pulling the spliced cables through the duct without substantially disturbing the insulating qualities of said insulating means enclosed thereby, the diameter of said tinned copper sleeve being slightly greater than that of said sheaths and the end portions thereof being tapered to the diameter of said sheaths, filler means in one of said tapered end portions providing for evacuation and subsequent filling of the splice with cable compound, and a riding wipe at each end of said sleeve and extending radially therefrom beyond any parts of the same and of said filler means to prevent abrasion of said tinned copper sleeve when the spliced cables are drawn into the duct.

HERMAN HALPERIN.